United States Patent [19]

Gross et al.

[11] 4,187,446
[45] Feb. 5, 1980

[54] SCREW-IN FLUORESCENT LAMP WITH MAGNETIC ARC SPREADING

[76] Inventors: Leo Gross, 36-11, 217 St., Bayside, N.Y. 11361; Merrill S. Skeist, 7 Fairchild, Plainview, N.Y. 11803

[21] Appl. No.: 834,651

[22] Filed: Sep. 21, 1977

[51] Int. Cl.² .................. H01J 17/14; H01J 17/34
[52] U.S. Cl. .......................... 315/58; 315/267; 313/204
[58] Field of Search ............ 315/62, 60, 59, 58, 315/267; 313/204, 493, 484

[56] References Cited

U.S. PATENT DOCUMENTS

| | | | |
|---|---|---|---|
| 2,306,628 | 12/1942 | Lemmers | 313/204 |
| 2,406,146 | 8/1946 | Holmes | 313/204 |
| 2,411,510 | 11/1946 | Abadie | 315/62 X |
| 2,501,375 | 3/1950 | Breadner et al. | 313/204 X |
| 3,059,137 | 10/1962 | Reaves | 313/204 |
| 3,296,480 | 1/1967 | Walz | 313/204 |
| 3,508,103 | 4/1970 | Young | 313/493 |
| 3,521,120 | 7/1970 | Anderson | 313/493 X |
| 3,611,009 | 10/1971 | McNeil | 313/204 |
| 3,848,150 | 11/1974 | Taxil et al. | 313/204 |
| 3,899,712 | 8/1975 | Witting | 313/493 |

Primary Examiner—Alfred E. Smith
Assistant Examiner—Charles F. Roberts
Attorney, Agent, or Firm—Kenneth S. Goldfarb

[57] ABSTRACT

A compact fluorescent lamp with a screw-in plug to fit conventional screw sockets which operates at 20-30 watts and provides the lumen output of a 75-100 watt lamp. The lamp is essentially a hollow cylinder with a glass envelope for the two outer walls. The space between the two outer walls is partitioned to constrain the arc discharge to follow a zigzag path around the surface of the lamp. The design parameters are such that the lumen output per square inch of phosphor is greater than from conventional tubular fluorescents. Efficiency is promoted by novel ballast design. The ballast fits into the hollow center of the lamp. The ballast is constructed of special shape to spread the arc within the evacuated glass envelope, thus reducing the current density and the total current, but maintaining the lumen output of the phosphor.

4 Claims, 6 Drawing Figures

SCREW-IN FLUORESCENT LAMP WITH MAGNETIC ARC SPREADING

BACKGROUND OF THE INVENTION

1. Field of the Invention

The present invention relates to electric discharge lamps which have fluorescent material deposited on the envelope containing the discharge path, that is, fluorescent lamps.

2. Description of the Prior Art

Considerable research effort has been expended since fluorescent lamps became available, to develop a compact fluorescent light source with a screw-in plug as replacement for standard incandescent lamps. Inventive ingenuity has produced lamp designs not now being marketed because of manufacturing difficulties to mass produce due to involved internal shapes and an inability to lay down uniform luminescent coatings.

A recent patent, U.S. Pat. No. 3,899,712, wraps a helical tube around a cone. The tube is fabricated from two pieces: a depressed groove in the cone, and a mating piece joined to the groove to complete the helical tube. This approach is slightly simpler than that taken by U.S. Pat. No. 3,296,480 where the helical path is formed by three elements: an inside and an outside cone, and an internal barrier forming the helix. U.S. Pat. No. 2,501,375 is similarly constructed, but more convoluted, in that the tube is led into the interior of the form on which the helical tube is wound. The forming of the tube and sealing of the two halves of the tube along the longitudinal edges are expensive and a major obstacle in manufacturing, fraught with prohibitive shrinkage.

U.S. Pat. No. 3,611,009 creates an annular fluorescent between glass panels with a bellast above, both held in a metal fixture with a screw-in plug. The discharge energizes the phosphor at its maximum lumen output for a limited area near the arc. U.S. Pat. No. 2,406,146 explored various designs by which the arc discharge could be constrained to a zigzag path, but did not address itself to manufacturing ease or to providing a lamp with a screw-in plug.

Somewhat earlier, U.S. Pat. No. 3,059,137 described a circline toroidal fluorescent with ballast and starter within the toroid, the fixture having a screw-in plug.

Another approach, U.S. Pat. No. 3,521,120, to a screw-in lamp, avoids the arc discharge and energizes the gas with a radio frequency field. To get sufficient energy into the lamp, the frequency is quite high. As a result, radio frequency interference creates problems severely limiting its application; in addition, additional complexity of generating sufficient wattage at frequencies much higher than the 60 Hz power line frequency.

Fluorescent panels have been described with partitions to confine the arc discharge to a zigzag path, as in U.S. Pat. No. 3,848,150, which uses T-shaped baffles in a cylindrical tube. Straight-edge partitions are used in U.S. Pat. No. 3,508,103. An early version of applying partitions is described in U.S. Pat. No. 2,306,628. The common difficulty in fabricating these devices is insuring a leakproof seal between the edges of the partitions and the glass envelope, especially since these partitions are added as a separate part to be joined to one or both walls of the envelope in the manufacturing process, a difficult, expensive, and not uniformly successful technique.

SUMMARY OF THE INVENTION

Accordingly, it is the object of the present invention to provide a fluorescent lamp, a gas discharge device, that is compact, has a screw-in base to fit incandescent lamp sockets, and that can be made with high speed machinery at low cost. Such a fluorescent lamp, a ready replacement for incandescent lamps, will save considerable electrical energy by providing the same luminosity at lower wattage.

Another object of the invention is to provide the maximum fluorescent surface area in a globular or cylindrical configuration, completely energized by the arc discharge.

A further object is an envelope design that does not need to meet close tolerances to be fabricated.

A yet further object of the invention is to minimize the number of partitions required in the arc's zigzag path around the lamp by utilizing techniques for spreading the arc discharge.

These advantages are achieved by blowing, molding, or pressing the glass envelope and partitions in shapes which do not require precise mating or tolerances. The ballast and starting circuitry are contained in the hollow center of the lamp. The ballast, of novel design, also functions to generate an expanding electromagnetic field which serves to spread the arc periodically throughout the volume of the lamp envelope, thus energizing the phosphor to its maximum efficient luminescence.

The invention can be understood by referring to the drawings, wherein:

DETAILED DESCRIPTION OF THE INVENTION

Figure 1:
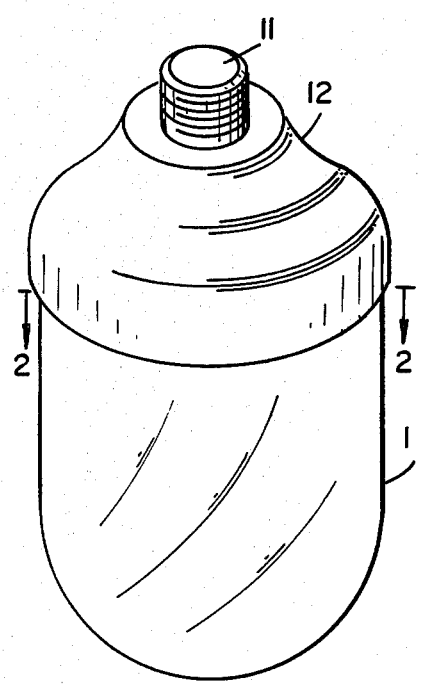
FIG. 1 is a pictorial view of the fluorescent lamp with a screw-in base.
Figure 2:
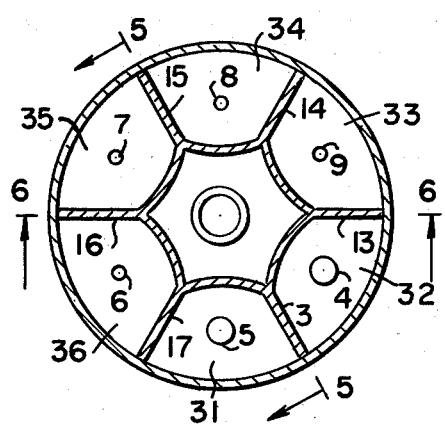
FIG. 2 is a horizontal sectional view, taken along the plane of line 2—2 in FIG. 1 showing filament mountings.
Figure 4:
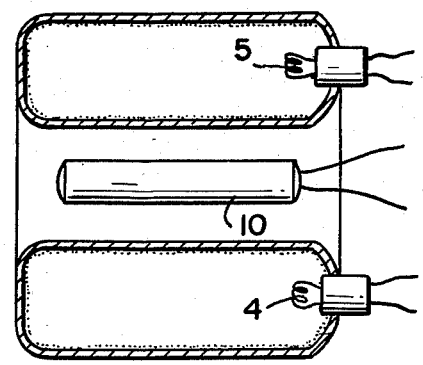
FIG. 4 is a schematic view of an alternative simpler embodiment of the lamp structure; The filaments are shown opposite one another for clarity though they are separated by a single partition in the actual lamp.
Figure 6:
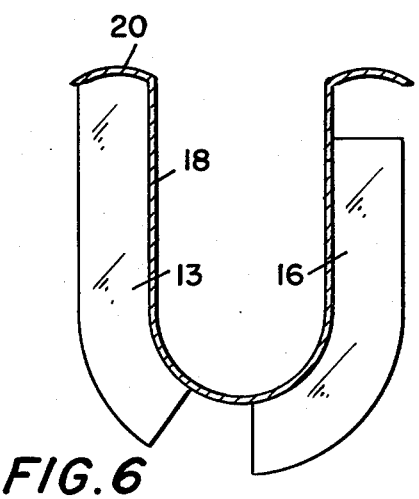

In FIGS. 1 and 2, the general shape of one embodiment of the invention can be seen. The fluorescent lamp comprises a double-walled envelope 1 with a hollow center. The interior 2 of the lamp envelope is partially evacuated and carries the arc discharge. The series of partitions 3, 13, 14, 15, 16, and 17 form compartments 31, 32, 33, 34, 35, 36 and constrains the arc to follow a zigzag path throughout the entire envelope from one filament 4 in compartment 32 to the other filament 5 in compartment 31. The filaments are nominally called electrodes or thermionic cathodes. The number of partitions can be one or any greater number. In the embodiment shown, the six partitioned chambers 31 through 36 are shown to provide a compact path throughout the envelope, approximately two feet long for a 20–25 watt fluorescent lamp with the luminous output of a 75 to 100 watt incandescent lamp. The size of the envelope and the number of partitions can be adjusted to create a fluorescent lamp of any desired wattage and path length. The lamp envelope has apertures where the filaments are inserted. Other apertures 6, 7, 8, 9, are ports from which the lamp is filled with a phosphor slurry to form the fluorescent coating, which apertures are sealed after the fluorescent coating 22 has been formed. The partition 3 between the filaments is a complete barrier to the arc. The adjacent partition 13 has an opening at the opposite end of the lamp from the filament and the next following partition 14 is open at the filament, the partition gap location alternating so that the arc is constrained to follow its zigzag path around the lamp through partitions 15, 16, and 17 to the other filament. The inner lamp envelope 18, which can be cylindrically shaped, is shown curved inward between partitions to strengthen the envelope, since glass has greater strength in compression than in tension.

Figure 5:
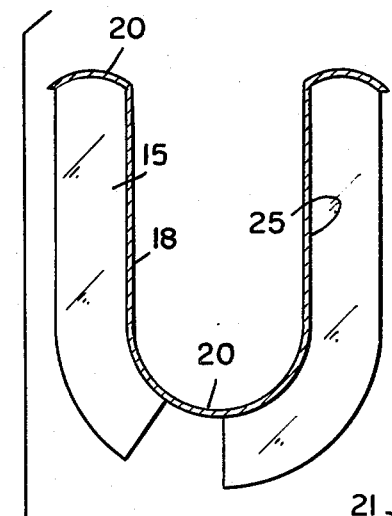
FIG. 5 is an exploded sectional view taken along the plane of line 5—5 in FIG. 2 illustrating the two sections from which the lamp is fabricated; and, FIG. 6 is a sectional detail view taken along the plane of line 6—6 in FIG. 2.

The lamp envelope is made, by glass blowing machinery, in two pieces, as can be seen best in FIG. 5, with an inner section 20 comprising the inner wall 18 and the partitions. The outer envelope 21 is then sealed to the inner section. Accurate mating of the two units is not required and tight seal of the partitions to the outer wall is readily and routinely completed. In another embodiment, the lamp envelope, together with the partitions, is formed in a pressed glass die to which the bottom glass surface of the lamp is sealed. The lamp, when sealed, customarily contains 1–4 torr of Argon plus sufficient mercury vapor, approximately 10 microns, to form the arc discharge.

Figure 3:
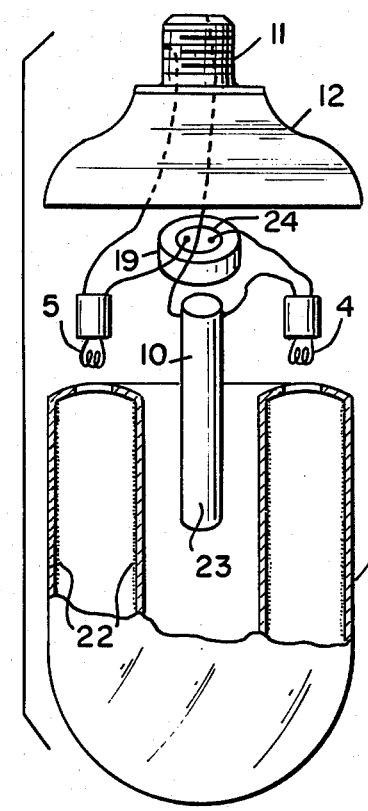
FIG. 3 is an exploded view of the lamp showing the ballast and lamp circuitry housed inside the hollow center of the lamp.

The interior cavity of this lamp, FIG. 3, contains the arc spreading coil 10, which also serves as the ballast, located in the center of the cavity. The arc spreading coil/ballast is connected to the associated circuit, 19, containing the starter 24, and connections from the filaments 4, 5 and the screw-in plug 11. The screw in plug 11 is cemented to the lamp by a bezel 12 under which the associated circuitry is housed. The ballast is specially designed as to length and windings and is housed in a case of non-ferrous material which permits the magnetic field of the coil to extend throughout the glass envelope of the lamp and provides a high voltage starter pulse to initiate the arc discharge when the current flow through the starter is interrupted. The arc spreading coil/ballast 10 produces a high voltage pulse which initiates the arc as in conventional fluorescent lamps. As the magnetic field reverses, it expands and contracts with the oscillations in flow of the AC power supply. This causes the electrons in the arc discharge, which must move in a direction perpendicular to the magnetic field, to occupy the entire volume of space within any one partition. Normally, the arc discharge is cylindrical, approximately one inch in diameter, following the shortest path between the electrodes. With the alternating magnetic field applied, the arc discharge expands to more actively energize the phosphor on the inner surfaces of the lamp envelope. Thus, fewer partitions need be used to constrain the arc path providing freedom to select path length, arc current, and lamp wattage upon consideration of desired lumen output for any given lamp shape and size. For example, the lamp design shown with six partitions has somewhat more than two inches between partitions on the outer glass wall, and the phosphor is fully energized as would be true also were fewer partitions present. The efficacy of the action of the special ballast in this invention increases as the power frequency is raised. Thus, fewer partitions can be used with larger lamp envelopes, permitting the manufacture of lamps of high wattages in compact cylindrical and semi-spherical configuration. The invention described herein can be operated at power line and high frequencies from 50 Hz to 30 KHz frequencies and above.

An increase in luminous output is achieved by coating the inside envelope with a reflective material 25 to reflect light coming to the interior of the lamp back to the outside of the lamp envelope. Alternatively, the same goal is achieved by making the ballast case with a reflective outer surface.

The circuitry for the ballast is well known at lower power frequencies. At higher frequencies, solid state circuits are also known to the art. Here, the ballast core is customarily of ferrite material and considerably lighter. Whatever the line frequency, instant starting of the fluorescent lamp is achieved by the application of a high voltage of approximately 1,000 volts to the filament from the starting circuit by ballast winding design.

The invention described herein is new and Letters Patent is claimed for:

1. A fluorescent lamp comprising an outer envelope having a hollow center, partitions defining at least one chamber in said envelope, said partitions constraining the arc discharge to follow a zigzag path around the envelope, said chamber containing two electrodes to form the arc discharge, and a luminescent phosphor coating all interior walls of said chamber and envelope, ballast and circuitry means in said hollow center, and a screw-in base secured to said envelope and electrically operatively connected to said ballast and circuitry means and said filaments.

2. A fluorescent lamp according to claim 1, wherein said partitions are integrally formed with each other and an inner wall defining said hollow center.

3. A fluorescent lamp according to claim 2, wherein said partitions are sealed to said envelope.

4. A fluorescent lamp or arc discharge device according to claim 1, wherein said ballast has a nonferrous housing and spreads an arc discharge within said envelope.

* * * * *